United States Patent
Albrecht et al.

(10) Patent No.: US 8,625,229 B2
(45) Date of Patent: Jan. 7, 2014

(54) SERVO CONTROL IN A PATTERNED-MEDIA MAGNETIC RECORDING DISK DRIVE USING A REFERENCE TABLE

(75) Inventors: Thomas R. Albrecht, San Jose, CA (US); Michael Konrad Grobis, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 33 days.

(21) Appl. No.: 13/492,880

(22) Filed: Jun. 10, 2012

(65) Prior Publication Data

US 2013/0329315 A1 Dec. 12, 2013

(51) Int. Cl.
*G11B 21/02* (2006.01)
*G11B 5/09* (2006.01)
*G11B 5/596* (2006.01)

(52) U.S. Cl.
USPC ............... 360/75; 360/48; 360/51; 360/77.04

(58) Field of Classification Search
None
See application file for complete search history.

(56) References Cited

U.S. PATENT DOCUMENTS

| | | | |
|---|---|---|---|
| 6,643,082 B1 * | 11/2003 | Belser | 360/48 |
| 6,785,075 B2 | 8/2004 | Bryant et al. | |
| 6,999,267 B1 | 2/2006 | Melkote et al. | |
| 7,164,548 B2 * | 1/2007 | Hattori et al. | 360/48 |
| 7,532,424 B2 | 5/2009 | Sai et al. | |
| 7,643,234 B2 | 1/2010 | Albrecht et al. | |
| 7,911,728 B2 | 3/2011 | Albrecht et al. | |
| 8,059,352 B2 * | 11/2011 | Bandic et al. | 360/48 |
| 2011/0279924 A1 | 11/2011 | Albrecht et al. | |
| 2011/0286125 A1 | 11/2011 | Lille et al. | |

* cited by examiner

*Primary Examiner* — Andrew L Sniezek
(74) *Attorney, Agent, or Firm* — Thomas R. Berthold (57) ABSTRACT

A patterned-media magnetic recording disk drive has head positioning servo sectors on the disk that do not contain special patterns but merely use the same type of dots that are used for data. The "data" dots in angularly spaced sectors of the data tracks function as the servo sectors and are denoted as D-servo regions. The D-servo regions extend across an annular band of the disk, which may be a bootstrap band for self-servowriting. The dots in the annular band are randomly magnetized so that each track in each D-servo region provides a generally random readback signal at the data frequency. The precise radial and circumferential position of the read/write head within a D-servo region is determined by comparing the readback signal with a set of reference signal waveforms from a look-up reference table and finding the reference signal waveform that matches the readback signal.

15 Claims, 10 Drawing Sheets

FIG. 8 though this is US 8,625,229 B2

SERVO CONTROL IN A PATTERNED-MEDIA MAGNETIC RECORDING DISK DRIVE USING A REFERENCE TABLE

BACKGROUND OF THE INVENTION

1. Field of the Invention

This invention relates generally to a patterned-media magnetic recording disk drive that has disks with discrete magnetizable data islands, and more particularly to a read/write head positioning servo control system in such a disk drive.

2. Description of the Related Art

Magnetic recording hard disk drives with patterned magnetic recording disks have been proposed to increase the data density. In patterned media, the magnetic recording layer on the disk is patterned into small isolated data islands or "dots" that represent individual data "bits". Like conventional non-patterned disks, patterned-media disks are also required to have nondata servo sectors that are used for read/write head positioning. The nondata servo sectors contain servo fields that generate readback signals that, when decoded, provide radial and circumferential position information about the read/write head. This information in turn is used by the servo system in moving the read/write head to the desired data track and maintaining it on track. In patterned-media disks the servo sectors typically contain patterned servo blocks separated by nonmagnetic spaces. However, the complexity of typical servo patterns and the requirement for their precise alignment with the patterned data tracks make the use of conventional servo patterns difficult in patterned-media disk drives.

In disk drives with conventional non-patterned disks, the servo patterns are written either by a dedicated servowriter or by the disk drive's write head in a technique referred to as self-servowriting. In patterned-media disk drives the discrete servo blocks are required to be magnetized in specific magnetization directions so as to generate the desired readback signal. However, the required precision to write the desired patterns at specific disk locations is very difficult to accomplish using a conventional servowriter or self-servowriting method.

What is needed is a patterned-media magnetic recording disk drive with an improved servo control system and an improved method for self-servowriting the nondata servo sectors.

SUMMARY OF THE INVENTION

In the disk drive of this invention the servo sectors do not contain special patterns but merely use the same type of dots that are used for data. Thus the "data" dots in angularly spaced sectors of the data tracks function as the servo sectors, which are denoted herein as D-servo regions. The angularly spaced D-servo regions extend across an annular band of the disk, which may be the entire annular data region of the disk, but preferably is just a relatively small radially inner band which may be used as a bootstrap band for self-servowriting. The dots in the annular band are randomly magnetized, i.e., either into or out of the disk, so that each track in each D-servo region provides a generally random readback signal at the data frequency. Each D-servo region is identified numerically, with 1 being assigned to the region that is aligned with the spindle index.

The D-servo region in which the read/write head is located is determined from the known rotational position of the disk from the spindle index. The precise radial and circumferential position of the read/write head within a D-servo region is determined by comparing the readback signal with a set of reference signal waveforms from a look-up reference table and finding the reference signal waveform that matches the readback signal. The reference signal waveforms in the lookup table are generated by use of the inside diameter (ID) crash stop of the rotary actuator that supports and moves the read/write heads across the disks. First the actuator is biased against the ID crash stop by applying direct current (DC) to the actuator coil. Then the current is incrementally increased or decreased in steps between disk rotations using the known torque constant of the actuator and elastic modulus of the crash stop to step the read head radially outward. At each step the signal from the randomly magnetized dots in the D-servo regions is read and stored in the lookup table. Thus each lookup table entry is a digitized value of the reference signal waveform from one radial step and is identified by a radial position corresponding to an actuator current value.

For a fuller understanding of the nature and advantages of the present invention, reference should be made to the following detailed description taken together with the accompanying figures.

DETAILED DESCRIPTION OF THE INVENTION

Figure 1:
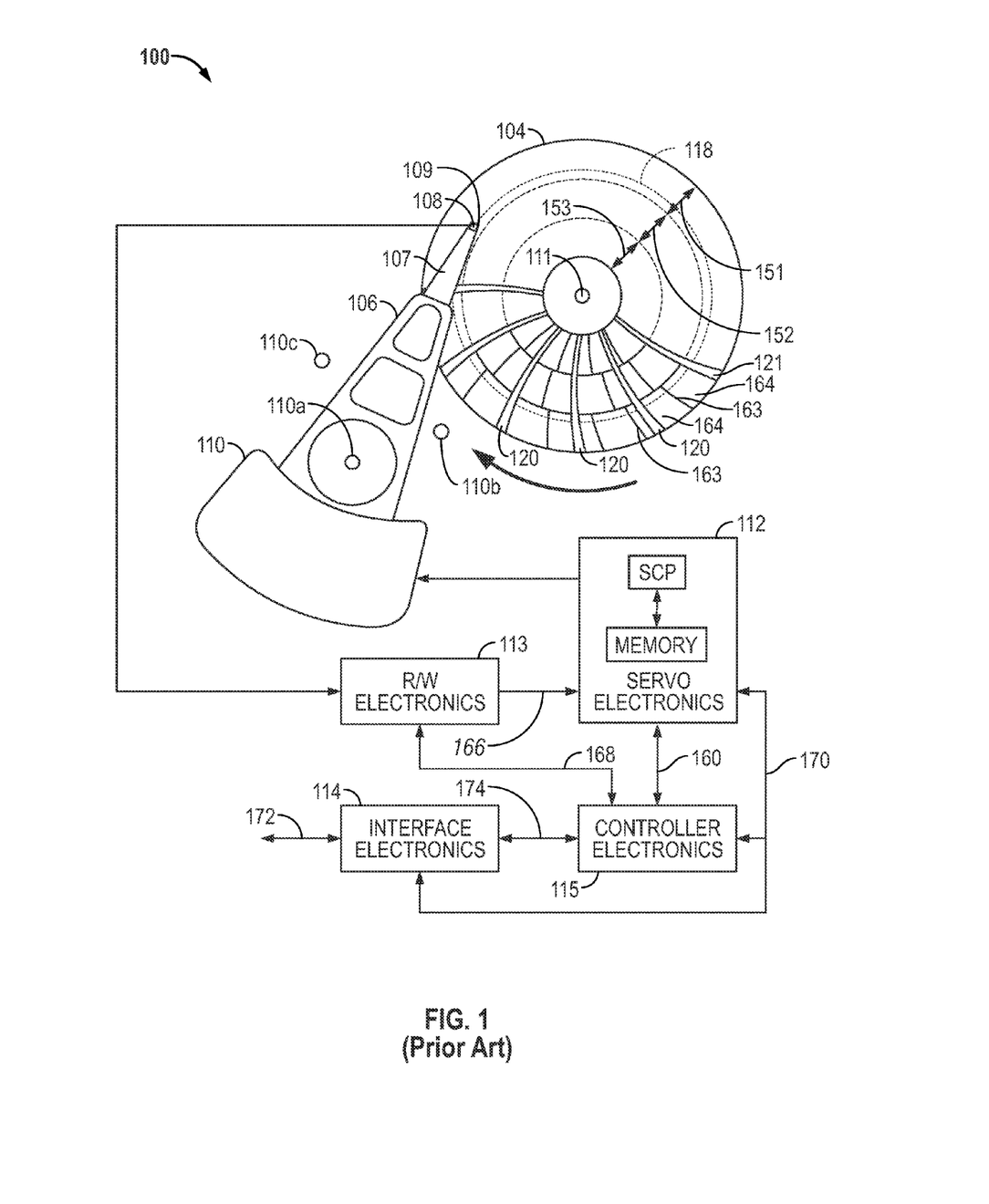
FIG. 1 is a schematic of a patterned media magnetic disk drive according to the prior art.

FIG. 1 is a schematic of a patterned media magnetic disk drive 100 according to the prior art. Disk drive 100 includes a magnetic recording disk 104 containing bit-patterned media (BPM), a voice coil motor (VCM) actuator 110, an actuator arm 106, a suspension 107, a slider 108, and a read/write head 109. Read/write head 109 is typically a combination of an inductive write head and a magnetoresistive read head that is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. The actuator 110 is rotatable about pivot 110a between an inside diameter (ID) crash stop 110b and an outside diameter (OD) crash stop 110c and moves the slider 108 across the disk 104. Only one disk surface with an associated slider and read/write head is shown in FIG. 1, but there are typically multiple disks stacked on a hub that is rotated by a spindle motor, with a separate slider and read/write head associated with each surface of each disk.

Disk 104 is mounted on the spindle of a spindle motor (not shown) that has an axis of rotation 111 and is rotated in direction 130. The spindle rotates at constant speed and generates an index mark or signal with each rotation. Disk 104 has a magnetic recording layer with radially-spaced concentric data tracks, one of which is shown as track 118, with each data track containing discrete spaced-apart magnetizable data islands or dots (not shown). Each data track may have a reference index 121 indicating the start-of-track, which occurs at a fixed time from the spindle index. Disk drive 100 is illustrated as a zone-bit-recording (ZBR) disk drive because the data tracks are grouped radially into a number of annular data bands or zones, three of which are shown as zones 151, 152, and 153, but the invention is fully applicable to a disk drive that does not use ZBR, in which case disk drive system 100 would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read/write head 109 for enabling synchronization of reading and writing the data dots in the data sectors 164. The sync fields may be pre-patterned, written by the write head, or a combination of both.

Each data track also includes a plurality of circumferentially or angularly-spaced servo sectors 120. The servo sectors include servo information detectable by the read/write head 109. The servo information is used by the servo electronics 112 for moving the read/write head 109 to desired data tracks and maintaining the read/write head 109 on the data tracks. Each of the servo sectors 120 in a data track typically contains a servo timing mark (STM) that indicates the start of the servo sector, a track identification (TID) code, and a portion of a pattern of magnetized blocks or high-frequency bursts that are decoded or demodulated to provide a head position error signal (PES). The PES is a measure of how far the head is off track from the track centerline. The servo sectors 120 in each track are aligned circumferentially with the servo sectors 120 in the other tracks so that they extend across the tracks in a generally radial direction, as represented by radially-directed servo sectors 120. In a BPM disk the servo sectors are typically special patterns that are formed at the same time as the discrete data dots in the data tracks during fabrication of the BPM disk. The special patterns in the servo sectors 120 are magnetized once in a servo writing process during manufacturing of the disk drive. The servo sectors 120 are non-data regions that that are not intended to be erased during normal operation of disk drive 100.

The electronics associated with disk drive system 100 include read/write (R/W) electronics 113, servo electronics 112, controller electronics 115, and interface electronics 114. In the operation of disk drive system 100, the R/W electronics 113 receive signals from read/write head 109 and passes servo information from the servo sectors 120 to servo electronics 112 and data signals from the data sectors 164 to controller electronics 115. Servo electronics 112, which typically includes a microprocessor or servo control processor (SCP) 112a and associated memory 112b, decodes the servo information from the PES fields and generates a current that drives VCM actuator 110 to position read/write head 109. Interface electronics 114 communicates with a host system (not shown) over interface 172, passing data and command information. Interface electronics 114 also communicates with controller electronics 115 over interface 174. In the operation of disk drive system 100, interface electronics 114 receives a request for reading from or writing to the data sectors 164 over interface 172. Controller electronics 115 receives a list of requested data sectors from interface electronics 114 and converts them into a set of numbers that uniquely identify the disk surface, track, and data sector. The numbers are passed to servo electronics 112 to enable positioning read/write head 109 to the appropriate data sector.

Figure 2:
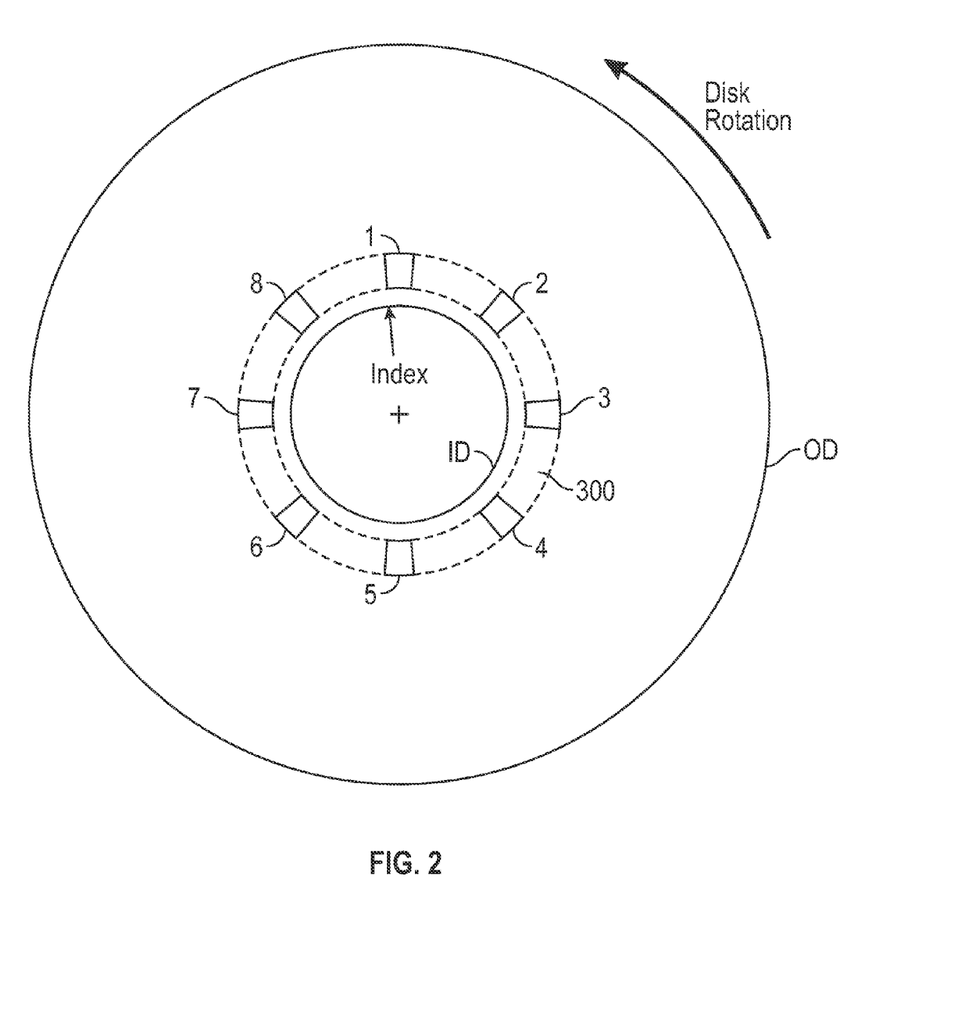
FIG. 2 is an illustration of the angularly spaced D-servo regions at an inside diameter (ID) band according to the invention.

In this invention, the servo sectors do not contain special patterns but merely use the same type of dots that are used for data. Thus the "data" dots in angularly spaced sectors of the data tracks function as the servo sectors, which are denoted herein as D-servo regions or wedges. The angularly spaced D-servo regions extend across an annular band of the disk, which may be the entire annular data region of the disk, as shown by servo sectors 120 in FIG. 1. FIG. 2 is a schematic showing just 8 D-servo regions or wedges in just an inside diameter (ID) annular band 300, but there may be a large number of equally-angularly spaced sectors, for example 100 or more. Each D-servo region is identified numerically, with 1 being assigned to the region that is aligned with the spindle index. The band 300 that extends only over a relatively small radial dimension may be used as a bootstrap band for self-servowriting, as will be explained below.

The dots in the annular band are randomly magnetized, i.e., either into or out of the disk, so that each track in each D-servo region provides a generally random readback signal at the data frequency. The D-servo region in which the read/write head is located is determined from the known rotational position of the disk from the spindle index. The precise radial and circumferential position of the read/write head within a D-servo region is determined by comparing the readback signal with a set of reference signal waveforms from a look-up reference table.

Figure 3:
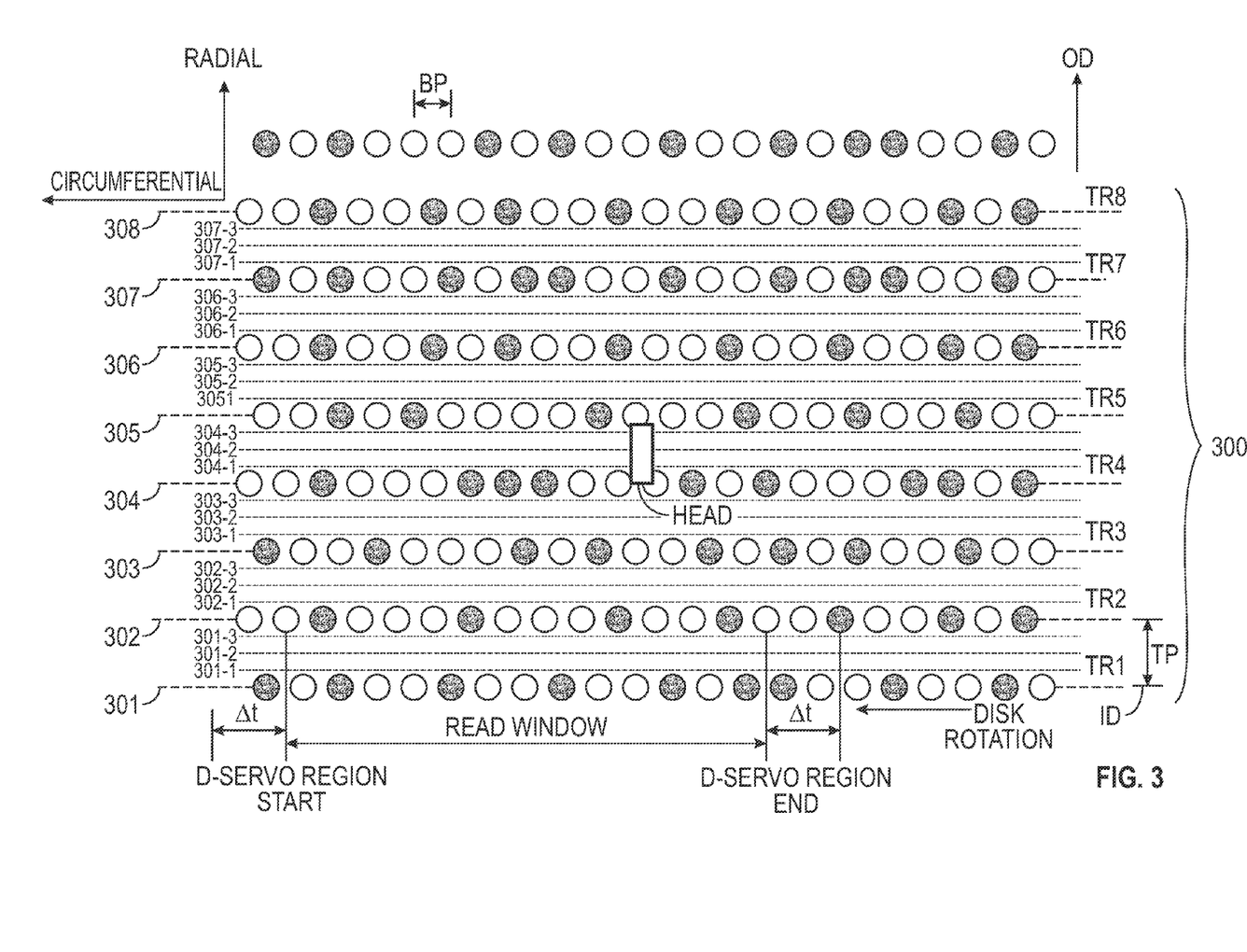
FIG. 3 is a schematic showing discrete randomly magnetized data dots in one D-servo region according to the invention.

The invention will be explained with reference to FIG. 3, which shows the discrete data dots in one D-servo region. For ease of illustration only 8 data tracks (TR1 to TR8) with track centerlines 301-308 radially spaced apart with a track pitch TP are shown in an annular band 300, which is located at the disk ID. If the D-servo regions are to be used only as a bootstrap band for self-servowriting, the band needs to have a radial width of only approximately 2 μm to cover the necessary radial offset between the read head and the write head, which would result in about 80 tracks at a TP of 25 nm. Also for ease of illustration, there are only about 10 dots shown in each track of the D-servo region, i.e., between the D-servo region start and sector end. However, the circumferential extent of each D-servo region will typically be between about 1-10 μm, depending on the desired servo accuracy. A longer circumferential extent allows for higher accuracy. For an along-the-track dot pitch or bit pitch (BP) of 17 nm the D-servo region would contain between about 60-600 dots in each track. Thus, assuming about 80 tracks in band 300, the total number of dots in each D-servo region would be between about 500-5000.

For the D-servo regions to function properly the dots must be magnetized in a way that does not produce long range correlations between dot values. This is represented in FIG. 3, where some of the dots in band 300 are shaded and some are white. The shaded dots represent one polarity of perpendicular magnetization (into or out of the page in FIG. 3), while the white dots represent the opposite polarity. The dots are generally randomly magnetized, meaning there is no specific pattern within a track or from one track to another track. Prior to the generation of the look-up reference table containing the reference signal waveforms, the entire disk, but at least the annular band is initialized to create the random magnetization of the dots. In one approach, the disk is initialized through an alternating current (AC) demagnetization in an external field. AC demagnetization consists of exposing the whole disk to external fields of alternating polarity that at first are large enough to reverse all dots in the disk, but then decrease in absolute amplitude with each half cycle. A typical AC demagnetization sweep could start at 15 kOe and end at 1 kOe, decrementing by 0.1-1% with each field change (e.g., 15 kOe, −14.85 kOe, 14.7 kOe, etc.). In a second approach the disk is initialized by writing random data to the dots in the desired servo band using the write head. In this approach no attempt is made to synchronize the writing to the physical locations of the dots. The radial position of the write head is controlled during the initialization by using the actuator ID crash stop, as discussed below.

Figure 4:
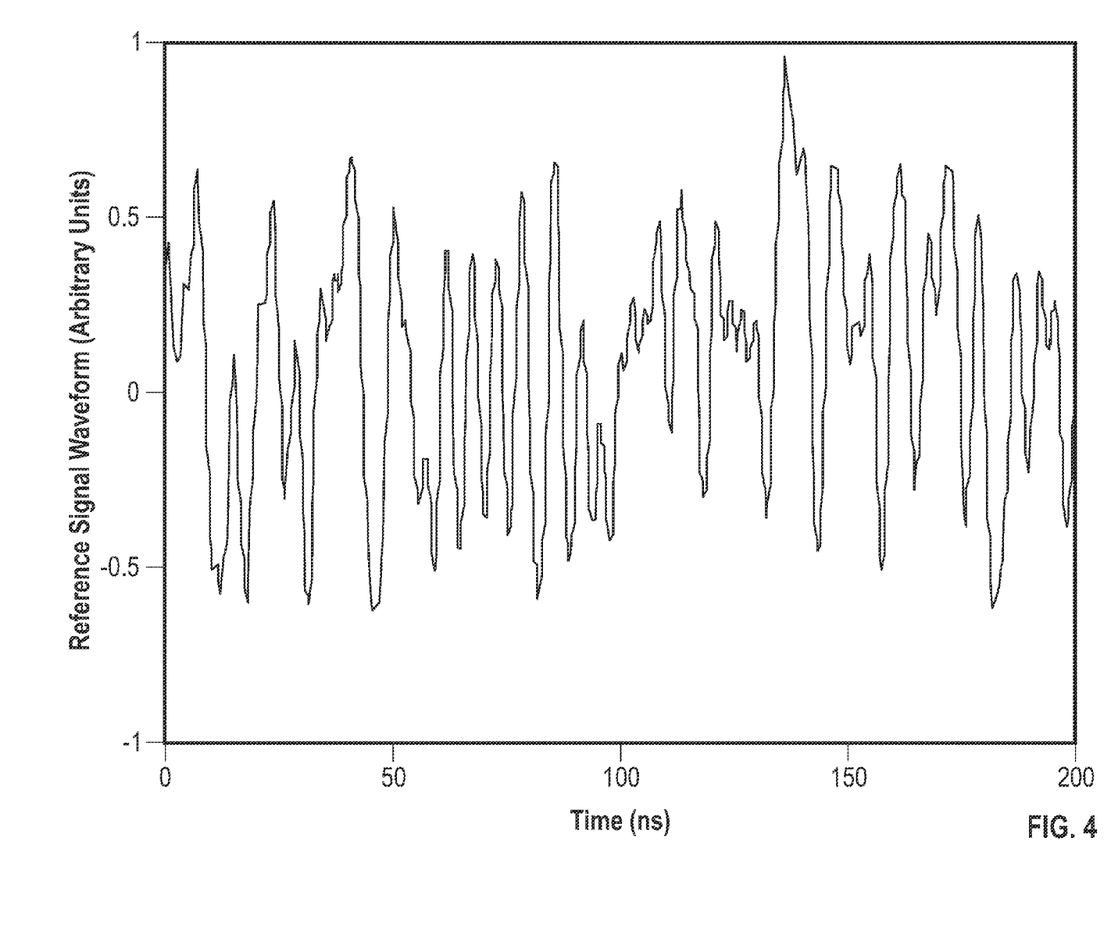
FIG. 4 is a representative analog signal waveform read from a D-servo region at one radial position of the read head.

In the preferred embodiment the look-up reference table entries are signal waveforms detected by the read head as the D-servo region rotates past the read head along the lines identified as track centerlines 301-308 and intermediate lines 301-1 to 301-3 up through 307-1 to 307-3. In FIG. 3, the read head is shown at a radial position corresponding to line 304-1. Each line corresponds to a unique radial position. The circumferential D-servo region start and end positions are determined from the time elapsed from the spindle index mark, which is a timing mark in synchronization with rotation of the disk. A read "window" is opened for the time period between the D-servo region start and end positions, during which the read head detects the reference signal. The read/write electronics preferably samples the signal from each line at a rate greater than the actual data rate, i.e., the rate at which the dots pass the read head. This can improve the accuracy of the reference signal waveforms stored in the table. FIG. 4 shows a simulated typical analog reference signal waveform generated by the read head sampling at a rate of 1.5 Giga samples/sec, which is 4 times the dot data rate, over a time period of 160 ns from start to end of a 1 μm long D-servo region.

The cross-track or radial positioning to acquire the reference signal waveforms is achieved by use of the actuator ID crash stop (item 110b FIG. 1). First the VCM actuator is biased against the ID crash stop by applying direct current (DC) to the actuator coil. Then the current is incrementally increased or decreased in steps between disk rotations using the known torque constant of the VCM actuator and elastic modulus of the crash stop to step the read head radially outward in steps corresponding to the radial spacing between the lines. As shown there are 4 radial positions per track, but there can be more or less than 4, depending on the design of the VCM actuator. Typically, a VCM actuator in a conventional disk drive is capable of moving the head in radial increments corresponding to about 1-2 nm.

Figure 5A:
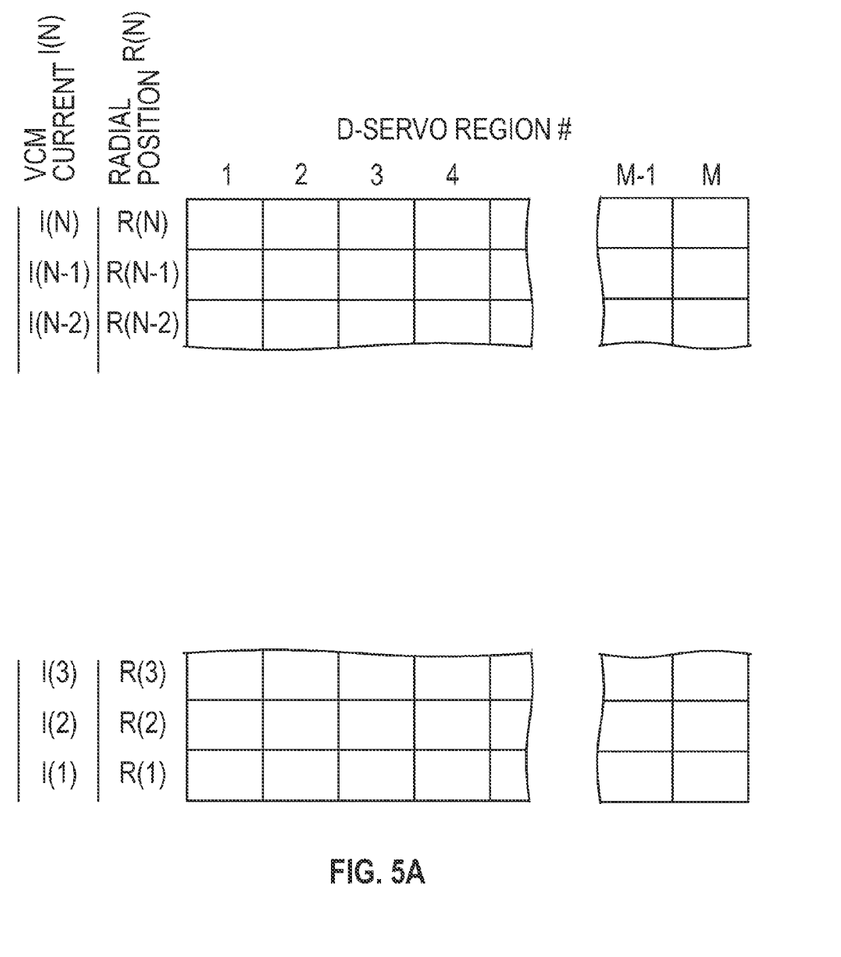
FIG. 5A shows the look-up reference table according to the invention for portions of several D-servo regions for a band with M sectors with each D-servo region having N radial positions and corresponding N values of voice coil motor (VCM) current.

FIG. 5A shows the look-up reference table for portions of several D-servo regions for a band with M D-servo regions. Each table entry is a digitized value of the reference signal waveform from one radial line in FIG. 3 and is identified by a radial position R (n) corresponding to a VCM current value I(n), where n is the number of the radial position with n=1 being at the ID and N being the number of radial positions in the annular band 300. Thus, in this example and comparing with FIG. 3, line 301-2 is the line corresponding to the 3rd radial increment R(3) from ID. Each table entry thus identifies both a precise radial position on the disk and a precise circumferential position on the disk by virtue of the known D-servo region number, which is associated with a known angular position from spindle index. In addition to the radial position, each waveform is also associated with a circumferential position offset C(n) (not shown in the table of FIG. 5A). C(n) represents the timing deviation of the start of each waveform from ideal. Ideally, each D-servo region would be equally spaced along the circumference and the waveforms within each D-servo region would be time aligned. However, spindle speed variations cause timing deviations between signal acquisitions, which need to be removed. The circumferential timing shifts in a D-servo region can be determined by time shifting the waveform at radial position n until the cross-correlation with waveform n+1 is maximized. The cross-correlation function can be fit to achieve a more precise value for the timing deviation from track to track. After the series of C(n) are calculated for each given D-servo region, the reference table can be shifted and trimmed so that each radial sample is time aligned within each D-servo region. The time alignment can be further refined by re-sampling, as is well known in the art, so that each waveform is time aligned within a fraction of a sample. After time alignment each D-servo region, the mean value of C(n) represents the timing shift from D-servo to D-servo region. The D-servo region can be trimmed to make the mean C(n) equal to zero for each D-region. Otherwise the mean of C(n) is stored and used as a timing offset when determining absolute position information.

Once the reference table has been compiled, it is used by the servo electronics to modify the control signal to the VCM actuator to position the read/write head, i.e., to move the head to the desired target track and to maintain the head on track during reading and writing. For example, assume the command is to read the data in target track TR4 (FIG. 3), located at radius $R_{TR4}$. The VCM actuator applies the current value required to move the read head to $R_{TR4}$ and after a settle time the read head detects a readback signal in the D-servo regions as the disk rotates. The detected readback signal is digitized and then compared with the waveforms in the table entries. The actual radial position of the head is the radial position (the R value in the table of FIG. 5A) associated with the reference table waveform that most closely matches the detected waveform. The difference between this actual radial position and the position of the target track TR4 is the radial position error signal (PES) that is used by the servo electronics to modify the VCM control signal so that the head is positioned precisely on the centerline of TR4. Since the positioning accuracy of the VCM actuator is known, it is only necessary to compare the readback signal with a subsection of the reference table. For, example if the VCM actuator cannot be in error by more than +/−2 tracks and the radial lines are at one-fourth TP as in FIG. 3, then only the table entries within 17 radial positions of TR4 need be tested and compared to find a match, assuming a radial sampling of 4 samples/track.

It is also possible to compare the readback signal with slightly time-shifted reference signal waveforms to accommodate for any changes in the disk rotational speed. For example, if the disk is rotating at 5400 RPM a $\frac{1}{1000}^{th}$ of a percent error in rotational speed would be about 100 ns error in timing from rotation to rotation. However, the change in speed would be gradual, and at most 10 ns in consecutive D-servo regions, in a disk with approximately 100 D-servo regions. The timing window is selected to ensure that the full D-servo region is captured. The readback signal is then compared with reference waveforms shifted by a corresponding +/−10 ns from the D-servo region start and end positions, as shown in FIG. 3. A shift of +/−10 ns corresponds to +/−3 bits or +/−12 samples, assuming a 17 nm BP and 4 samples per bit. The readback signal is trimmed appropriately prior to its comparison with the reference table waveforms. When a match is found the time shift between the matched waveform and the D-servo region start time corresponds to a circumferential position error which can be used as a write synchronization error signal (WSES). The WSES is used to modify the timing of the write signal so that during writing the write head is precisely located over a data dot. The timing shift is used to update the comparison windows in successive reference table comparisons.

There are several well-known approaches to compare the digitized readback signal with the digitized reference waveforms. In one approach, the comparison function is the square of the differences and the matched waveform is the one that produces the least sum of squared errors for all of the samples. In a second approach the comparison function is a sum of the products and the matched waveform is the one that produces the maximum sum. The radial and circumferential positions associated with the matched waveform are passed on to the servo system. To increase the precision of the position information, the output of the comparison function can be fit to find a minimum as a function of radius and time shift.

Figure 5B:
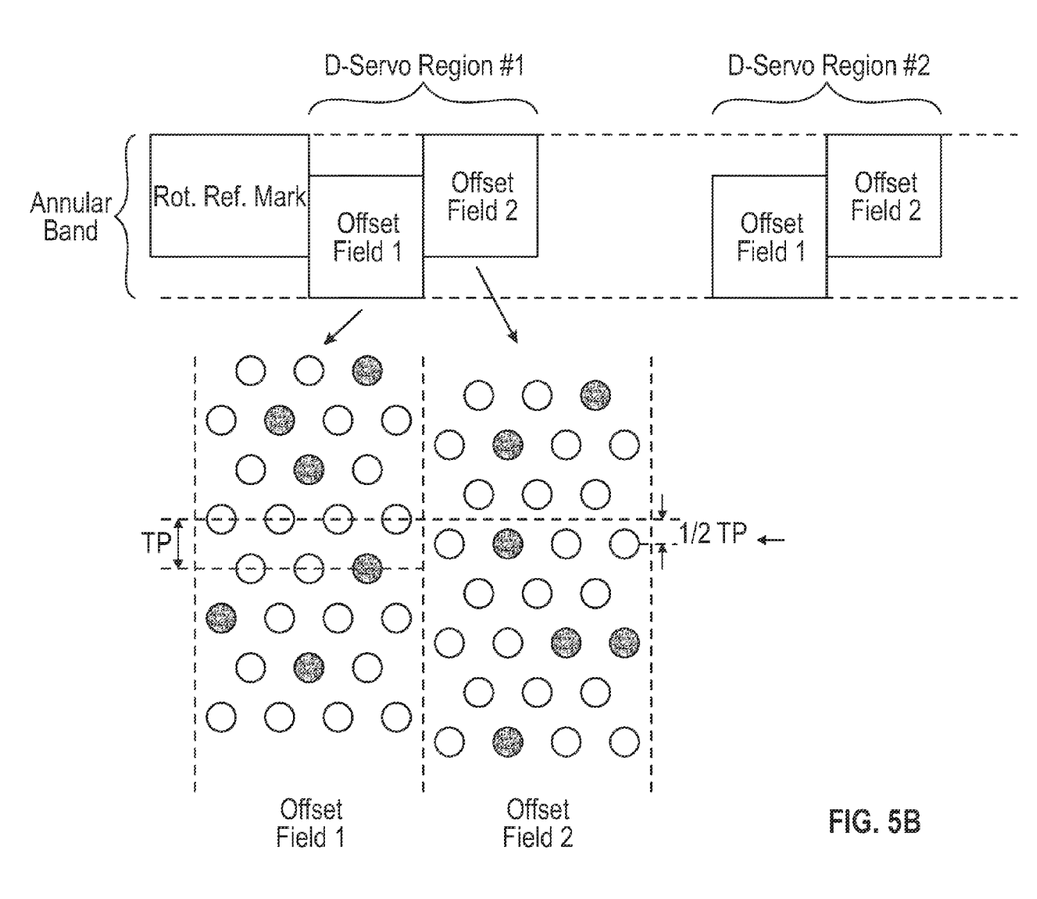
FIG. 5B shows two D-servo regions with two offset fields offset from each other by one-half the track pitch (TP).

The accuracy of the servo technique is improved if the D-servo regions contain fields that are offset from each other by ½ the track pitch (TP) in the radial direction. FIG. 5B shows the annular band with two D-servo regions, each of which contains two fields of data dots radially offset by ½ TP. The downtrack extent of each offset field should be close to half the length of the D-servo region. For 10 μm long D-servo regions the offset fields would be 5 μm long, with every other field offset by ½ the radial track spacing. In addition, the inner annular band may contain an identifiable region that provides a rotational reference for the patterned disk. The rotational reference region can be an offset field that is of a different length from the other offsets field or some other patterned mark or region that can be detected. The rotational reference region is used to determine the known relative locations of other patterned features on the disk, such as servo patterns.

Figure 6A:
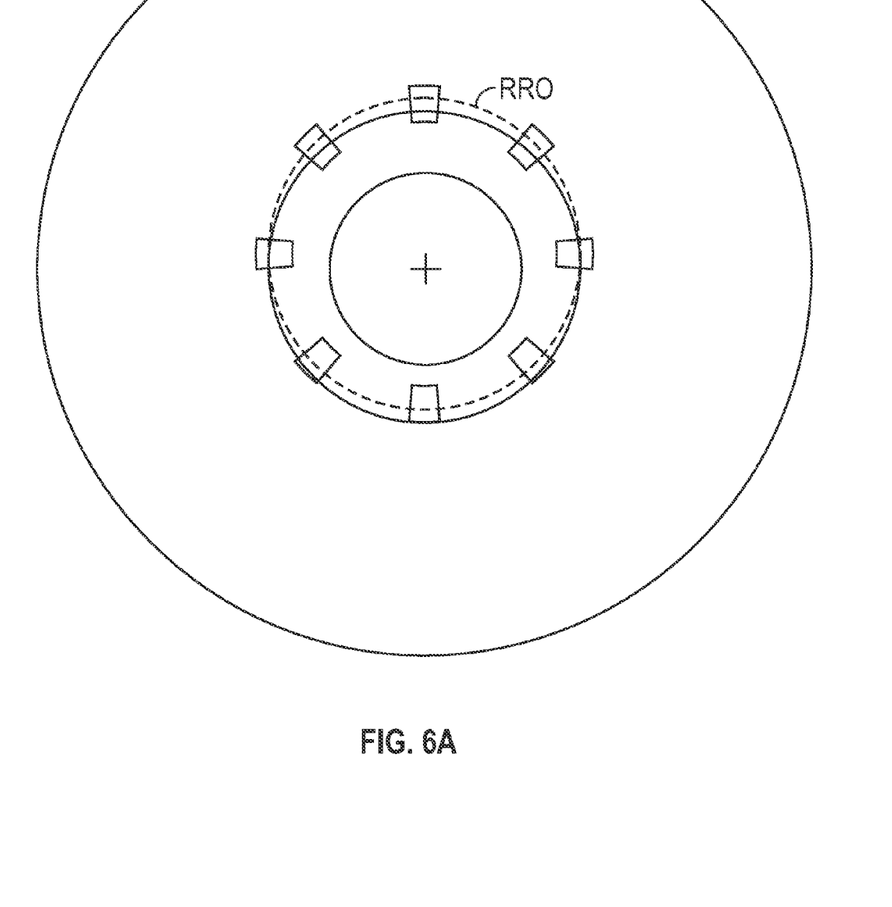
FIG. 6A is an illustration of the eccentricity of the angularly spaced D-servo regions at an inside diameter (ID) band as a result of repeatable runout (RRO).
Figure 6B:
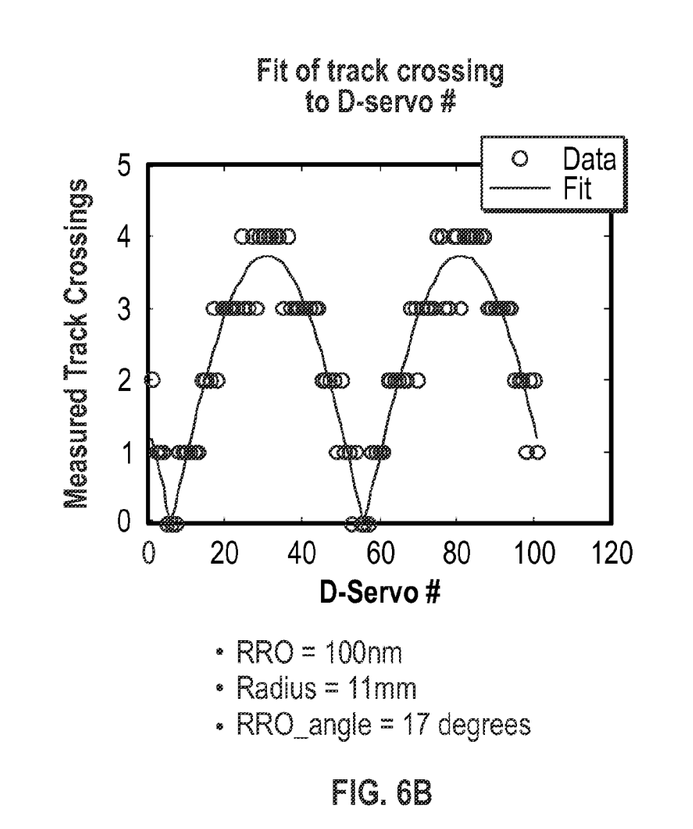
FIG. 6B is a curve fit of measured track crossings for determination of RRO.

In the above-described servo control technique it will likely be necessary to compensate for repeatable runout (RRO) of the data tracks. Because the patterned data tracks may not be precisely circular and may not be precisely centered at the center of the disk, and because the disk center may not be precisely aligned with the spindle axis of rotation, the patterned data tracks will have a runout. This is depicted in FIG. 6A with the dotted line connecting the sectors showing RRO from the perfect circle represented by the solid line. If the read head is held fixed, the data tracks will experience radial runout with rotation. RRO occurs at the known frequency of disk rotation. There are known techniques to measure RRO and the well-known approach for compensation is to feedforward the RRO to the VCM actuator control signal so the read head follows the eccentric data tracks, i.e., so the read head would follow the dashed line in FIG. 6A. The randomly magnetized tracks in annular band 300 (FIG. 3) in the D-servo regions can be used to measure the RRO. RRO causes the tracks to be at a skew compared to the circumferential direction. Hence, in certain D-servo regions the 10 μm long readback signal can include one or more track crossings. Higher skew leads to more track crossings per unit length. Track crossings can be detected, for example, by examining the modulations of the rectified readback signal at a frequency corresponding to the bit pitch. The RRO can be determined by measuring the number of track crossings (TC) at a fixed radius in each D-servo region M, and fitting TC(M) to a fit function fTC(θ). Here, $$fTC(\theta)=A*abs(\sin(\theta-\theta_0)/(R/\text{RRO}-\cos(\theta-\theta_0)) \quad \text{Equation (1)}$$

and represents the expected number of track crossings at distance R away from rotational center and rotational angle θ relative to the spindle index. The factor A is equal to D-servo circumferential length divided by the track pitch. RRO is displacement of the pattern center to rotational center and $\theta_0$ is the angle between the runout axis and the spindle index. An example of such fit is shown in FIG. 6B. The quality of the fit can be further refined be re-measuring TC(M) at slightly different radii and averaging. For small runouts (<1 μm) the expected number of track crossings can be zero in most D-servo regions. In this case runout can be measured by examining the track alignment between successive D-servo regions. Track misalignment can be deduced, for example, for calculating the spectral power at the island frequency for each D-servo waveforms, after rectification. This procedure will produce a power vs. radius curve for each D-servo region, with peaks at radial locations corresponding to track center. The cumulative shift in track centers can be fit to the expected functional form:

$$R(1+2*(\text{RRO}/R)*\cos(\theta-\theta_0)+(\text{RRO}/R)^2))^{0.5}-R \quad \text{Equation (2)}$$

Figure 6C:
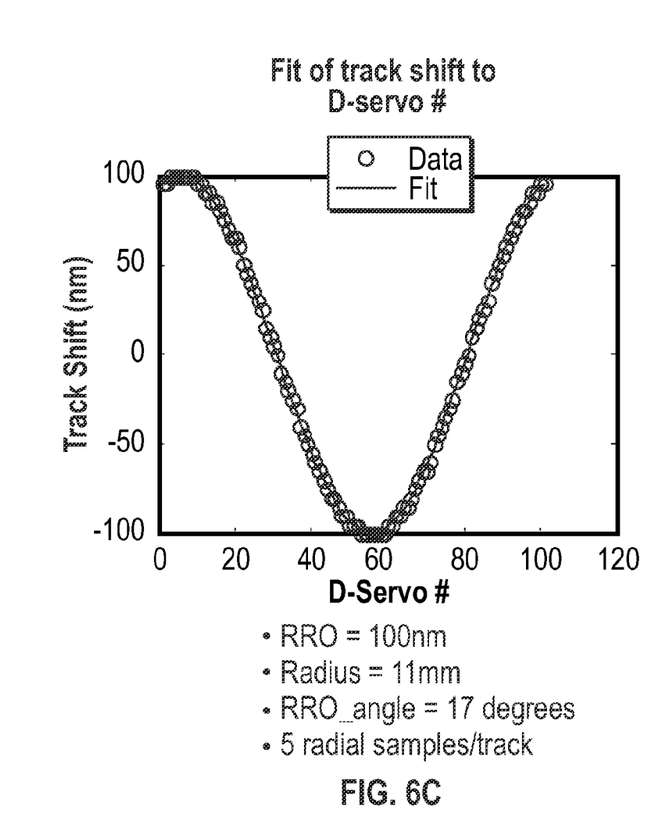
FIG. 6C is a curve fit of measured track shift for determination of RRO.

An example of such a fit is shown in FIG. 6C. Once the RRO is measured, it is used as a feedforward signal to the VCM actuator so that the read head precisely follows track center-lines 301-308 and intermediate lines 301-1 to 301-3 up through 307-1 to 307-3 to generate the reference signal waveforms that are digitized and stored in the lookup reference table. In the procedure described above, the track crossings and track shifts stemming are compensated to remove the effects of offset fields if they are present in the D-servo regions. The RRO measurement procedure can be iterated to refine its accuracy. In addition, equations 1 and 2 can be modified to allow higher-order RRO corrections, such as the elliptical shape of the pattern.

Figure 7:
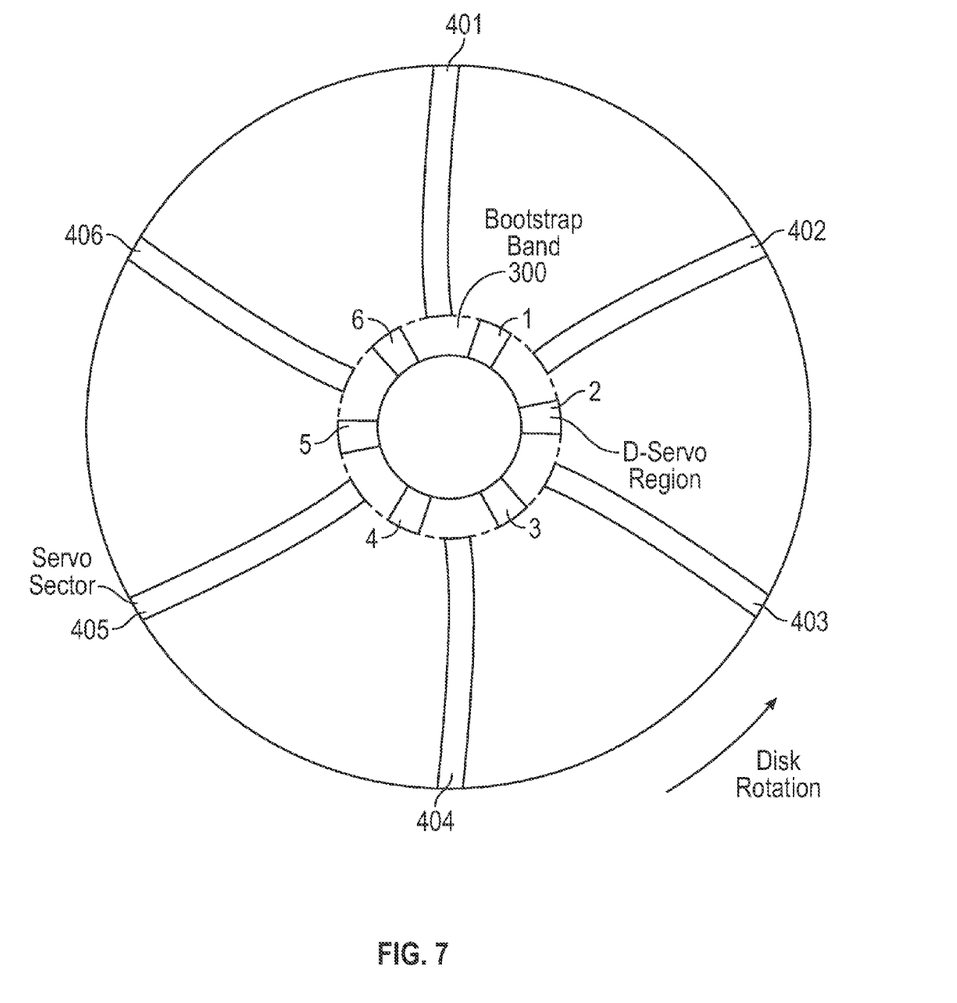
FIG. 7 is a high level schematic not to scale for showing the general layout of the bootstrap D-servo region band at the ID with several typical D-servo regions and conventional typical servo sectors extending across the disk.
Figure 8:
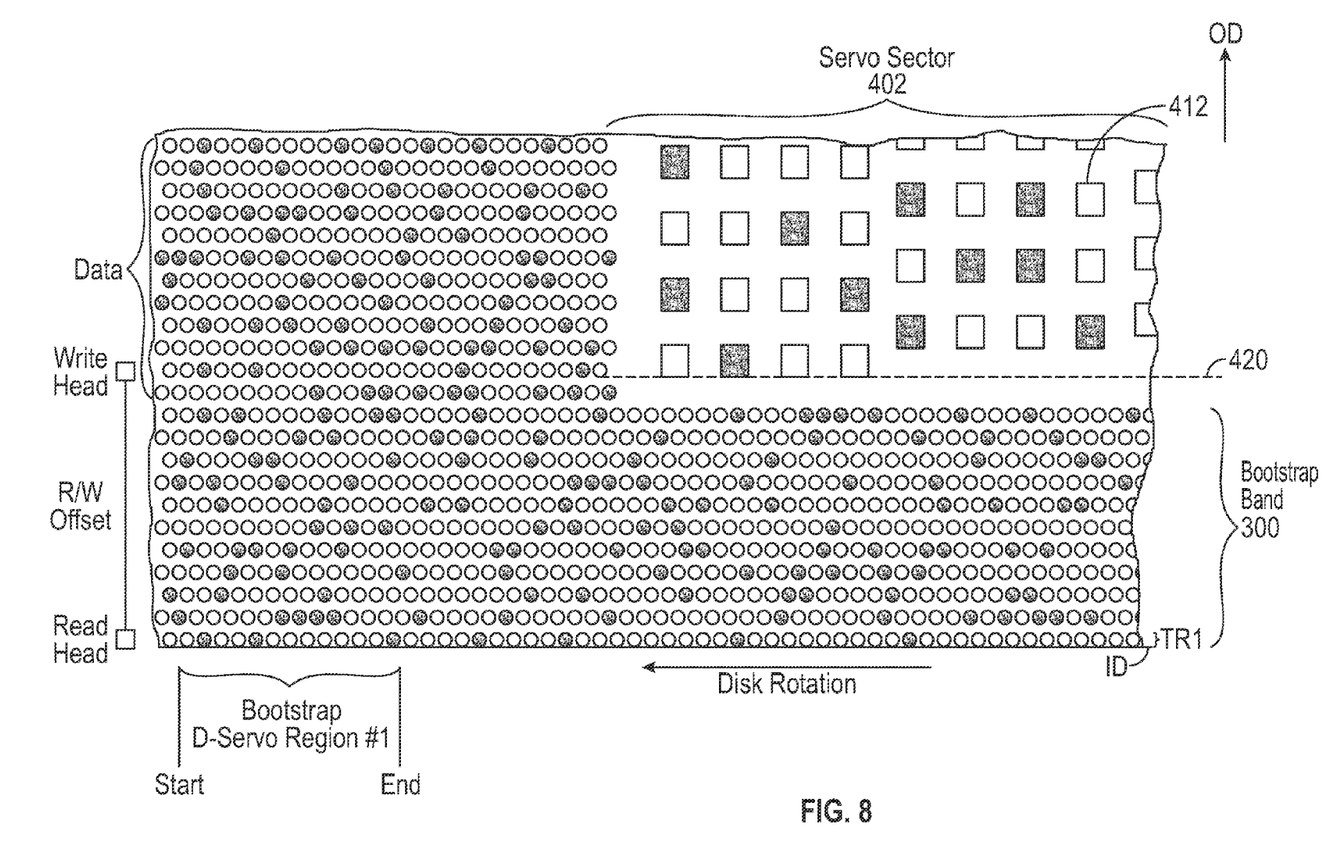
FIG. 8 is a more detailed view of one bootstrap D-servo region and one conventional servo sector from FIG. 7.

The angularly spaced D-servo regions described above and shown in FIG. 3 and the method of servo control using the reference table (FIG. 5A) to calculate the PES for modifying the VCM control signal can be used as a bootstrap servo technique to self-servowrite conventional servo sectors. The bootstrap D-servo regions are located in an annular bootstrap band at the disk ID and have a radial dimension approximately the same as the radial offset between the read head and the write head. FIG. 7 is a high level schematic not to scale for showing the general layout of the bootstrap band 300 at the ID with several typical D-servo regions 1-6 and conventional typical servo sectors 401-406 extending across the disk. As the read head is moved radially across the bootstrap band, the offset write head writes the servo patterns in the servo sectors 401-406. The VCM actuator continues to move the read head radially outwardly until it is moved beyond the bootstrap servo band 300, at which point the read head detects the previously written conventional servo patterns in the servo sectors 401-406, which are then used as servo control to continue writing servo patterns across the remaining radial extent of the disk. FIG. 8 is a more detailed view of bootstrap D-servo region 1 in ID band 300 and conventional servo sector 402 from FIG. 7. The read head is depicted as being aligned with TR1 so that the read/write (R/W) head offset results in the write head being aligned along line 420, which is the ID portion of servo sector 402. The servo sector 402 is depicted with patterned magnetizable blocks 412. The blocks 412 are patterned when the data dots are patterned during fabrication of the disk. The data blocks 412 in FIG. 8 are not meant to represent any particular servo pattern but are depicted merely to show that they can be of a different pattern and shape from the data dots. In one embodiment the servo sector 402 contains patterned islands nearly identical in size to the data islands, but with data sections shifted, staggered, or rotated. Some servo subsections can include offset fields or null servo patterns. In a different embodiment, the data blocks 412 are patterned so as to define the servo timing mark (STM) that indicates the start of the servo sector, the track identification (TID) code, and a portion of a pattern of blocks that are decoded or demodulated to provide a head position error signal (PES). As a result of the generation of the random magnetization of the data dots, the servo blocks also are generally randomly magnetized, as shown by white and shaded blocks. Thus to self-servowrite the servo sectors, the servo blocks 412 must be magnetized by the write head to create the desired magnetization pattern, for example all of them in the same direction or in alternating directions. This is accomplished using the bootstrap D-servo region #1 and the lookup reference table for control of the radial position of the read head, as described previously. The read head is maintained along the correct radial positions by using the above-described servo technique, which allows the offset write head to apply the correct magnetization to the servo blocks 412 as they pass the write head during rotation of the disk. The read head is moved radially outwardly with its radial position servo controlled and the write head continues to pattern the servo blocks 412. The circumferential location for the servo patterns can be determined through the help of the rotational reference mark described earlier. When the read head reaches line 420, it detects the servo blocks in the servo sectors, like sector 412, and the disk drive servo control system now uses the previously magnetized servo blocks 412 to control the position of the read head. The read head continues to be moved radially, using the servo blocks 412 for servo control, while the write head continues to magnetize the servo blocks until the OD is reached.

The operation of the disk drive as described above may be implemented as a set of computer program instructions stored in memory and executable by a processor, such as the SCP, or a separate controller or microprocessor. The processor performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for generating reference servo information for a magnetic recording disk drive that includes a processor, memory associated with said processor, a spindle for rotating the disk about a rotational axis, a read head and a write head, and a voice coil motor (VCM) actuator for moving the read head and write head across the disk, the disk having a plurality of generally concentric generally circular data tracks radially spaced by a track pitch (TP) and containing discrete magnetizable data dots, the method comprising:
   (a) generating a generally random magnetization pattern for the dots in an annular region of the disk;
   (b) maintaining the read head at a radial position while rotating the disk;
   (c) detecting with the read head a reference signal from a plurality of angularly spaced disk sectors in said annular region;
   (d) storing in memory data representative of the reference signal for each sector;
   (e) moving the read head radially by a radial increment less than TP; and
   continuing steps (b) through (e) until the read head has been moved radially across said annular region.

2. The method of claim 1 wherein the dot spacing along the tracks generates a readback signal at a dot frequency detectable by the read head and wherein the step of detecting a reference signal comprises detecting a reference signal at a frequency substantially greater than said dot frequency.

3. The method of claim 1 wherein the disk drive includes an inside diameter (ID) crash stop for the actuator and wherein moving the read head radially by a radial increment comprises applying an incremental VCM current with the actuator against the ID crash stop.

4. The method of claim 1 wherein the spindle generates an index mark with each disk rotation, wherein each disk sector has a sector start and a sector end each located at a unique angular position corresponding to a unique time from the index mark, each sector being identifiable by its angular position.

5. The method of claim 4 wherein detecting a reference signal comprises detecting a reference waveform from a sector start to a sector end for each sector and wherein storing data comprises storing a digital representation of the reference waveform in association with its sector identification and the radial position of the read head during said detection.

6. The method of claim 1 wherein the concentric tracks are misaligned with the spindle axis of rotation, resulting in repeatable runout (RRO) of the generally circular data tracks, and further comprising determining RRO information.

7. The method of claim 6 wherein maintaining the read head at a radial position during rotation comprises modifying said radial position with said RRO information.

8. The method of claim 1 wherein maintaining the read head at a radial position comprises maintaining the head at a fixed radial position relative to the spindle axis of rotation, and wherein storing data representative of the reference signal for each sector comprises storing said data in association with said fixed radial position.

9. The method of claim 8 wherein the concentric tracks are misaligned with the spindle axis of rotation resulting in repeatable runout (RRO) of the generally circular data tracks, further comprising determining RRO information, and wherein storing said data in association with said fixed radial position comprises storing said data in association with said fixed radial position modified by said RRO information.

10. A magnetic recording disk drive comprising:
   a disk having a plurality of generally concentric generally circular tracks radially spaced by a track pitch (TP) and containing discrete magnetizable dots, the disk having a plurality of angularly spaced sectors in an annular region wherein the dots in said sectors are generally randomly magnetized;
   a spindle for rotating the disk about a rotational axis, the spindle generating an index mark with each rotation;
   a read head;
   a write head;
   a voice coil motor (VCM) actuator for moving the read head and write head across the disk;
   a processor;
   memory associated with said processor; and
   a look-up table in memory, the table including, for each sector, a set of reference signal waveforms and associated radial positions, each reference signal waveform being representative of the signal detected by the read head from the generally randomly magnetized dots at said associated radial position, and wherein the number of radial positions is substantially greater than the number of tracks in said annular region.

11. The disk drive of claim 10 further comprising an inside diameter crash stop for the actuator, wherein said annular region is an annular band at the inside diameter of the disk, and wherein the write head is offset radially outwardly from the read head.

12. The disk drive of claim 11 further comprising a program of instructions in memory and readable by the processor for servowriting head-positioning servo information with the write head, the program of instructions undertaking the method acts comprising:

maintaining the read head at a target radial position within said annular band, said target radial position corresponding to the position required to maintain the offset write head on a target track for writing servo information in said target track;

detecting with the read head a readback signal from a sector;

matching said detected readback signal with a reference signal waveform in the look-up table;

identifying from the look-up table the radial position associated with the matched reference signal waveform;

calculating the difference between the target radial position and the identified radial position as a position error signal (PES);

moving the read head to a PES-adjusted target radial position; and     while maintaining the read head at said PES-adjusted target radial position, writing servo information in said target track.

13. The disk drive of claim 12 wherein the method act of identifying from the look-up table the radial position associated with the matched reference signal waveform comprises identifying the matched reference signal waveform from a subsection of the look-up table containing reference signal waveforms within a predetermined range of radial positions from the target radial position.

14. The disk drive of claim 12 wherein each sector is identified by its angular position corresponding to the time after an index mark, and wherein the method acts further comprise:

determining the angular shift of the detected readback signal from the matched reference signal waveform;

calculating a write synchronization error signal (WSES) from said angular shift; and     using the WSES, adjusting the writing of servo information in said target track.

15. The disk drive of claim 10 wherein the dots in each of the sectors in said annular band are arranged into two fields radially offset from each other by TP/2.

* * * * *